Jan. 1, 1952   J. J. PARKER ET AL   2,580,949
WORKHOLDER
Filed July 24, 1948   2 SHEETS—SHEET 1

INVENTORS
John J. Parker
London T. Morawski
BY
Barnes, Kisselle, Laughlin, & Raisch
ATTORNEYS Jan. 1, 1952 J. J. PARKER ET AL 2,580,949
WORKHOLDER
Filed July 24, 1948 2 SHEETS—SHEET 2

INVENTORS
John J. Parker
London T. Morawski
BY
Barnes, Kisselle, Laughlin & Raisch
ATTORNEYS Patented Jan. 1, 1952

2,580,949

UNITED STATES PATENT OFFICE 2,580,949

WORKHOLDER

John J. Parker and London T. Morawski, Detroit, Mich.

Application July 24, 1948, Serial No. 40,454

2 Claims. (Cl. 279—1)

This invention relates to a gauging instrument and particularly to an instrument for gauging surfaces of a work piece relative to the interior formation of the work piece.

The invention is concerned more especially with the gauging of work pieces which have an internal tooth formation, such as a spline formation. An example of work pieces which may be gauged by the device of the present invention is a gear which may be a spur gear or bevelled gear having a radial face and an external hub surface which are to be gauged relative to the internal splined formations. To this end the invention embodies a gauge having a holder or support with split teeth upon which the work piece may be mounted with indicating gauges for showing the condition of the radial face and the surface of the hub portion. A gauging instrument constructed in accordance with the invention is shown in the accompanying drawings, these drawings showing one form of device.

Fig. 3 is a sectional view taken substantially on line 3—3 of Fig. 2 showing the work piece applied to the holder.

Fig. 4 is a view of the work piece.

Figure 1:
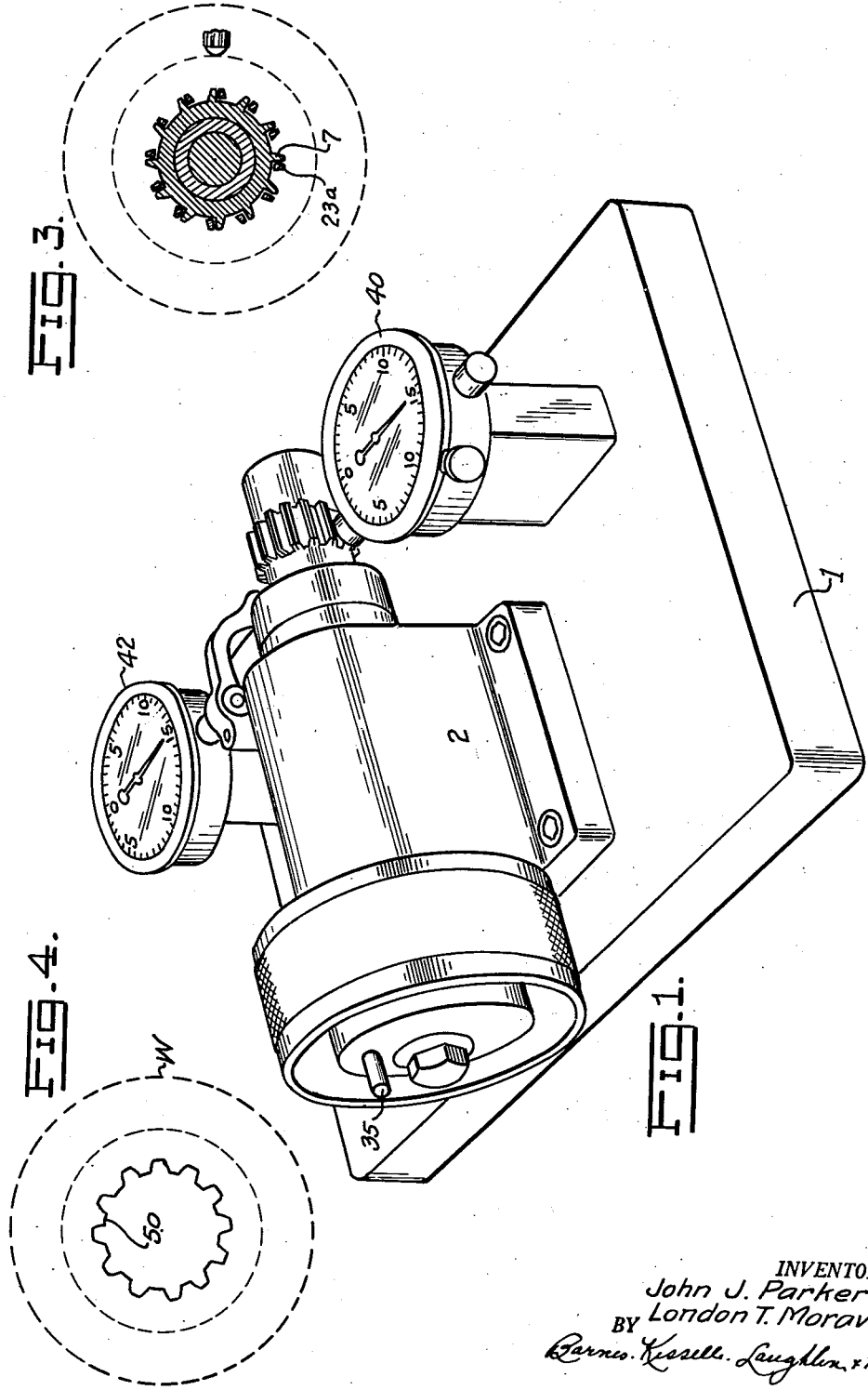
Fig. 1 is a perspective view of the gauging device.

The gauging device as shown has a suitable base 1 with a bearing block 2 mounted thereon. Mounted in the bearing block on a suitable bearing, as shown at 3, is a sleeve having an enlarged intermediate portion 4 for fitting in the bearing 3 so that it is rotatable and having projecting and relatively ensmalled end portions 5 and 6.

Mounted on the end portions 5 is a holder element 6 provided with tooth portions 7 with overhanging or projecting ends 7a. The member 6 may be attached to the projection 5a by a pin 8. Mounted on the projection 5 and between the holder element 6 and the block 2 is a stop member 10 which may be backed up by a washer 11. Mounted on the opposite end of the sleeve and on the extension 6 thereof is a hand wheel 15 which may be secured by screw 16.

A shaft 20 is journalled in the sleeve. One end of this shaft has an enlarged head 21 upon which is mounted a holder element 22 with tooth portions 23 having projecting ends 23a. The projecting ends 7a overlap the tooth portions 23 and the projecting ends 23a overlap the tooth portions 7 to thus provide a split tooth formation as will be seen by reference to Fig. 3. The element 22 may be mounted on the shaft as by means of a pin 25 and the shaft may be provided with an end cap 26.

The opposite end of the shaft has a member 30 non-rotatably affixed thereto and a coil spring 31 is positioned between the members 15 and 30. One end of the spring is anchored on a pin 32 affixed to the member 30 while the other member is anchored to a pin 33 mounted on the member 15. The member 20 has an operating handle 35. The spring 31 is a torsion spring and thus acts between the sleeve and the shaft to place a turning torque thereon which, however, is limited by a finger or abutment 36 on the member 15 which strikes the pin 33. The torsion spring holds the sleeve and the shaft so normally positioned that the teeth portions 23 and 7 are normally spaced apart. In other words, the tooth portions 23 and 7 cooperate in pairs to form a split tooth formation and the cooperating pairs are normally held spaced apart within the limits provided by the engaging finger 36 and pin 33.

Figure 2:
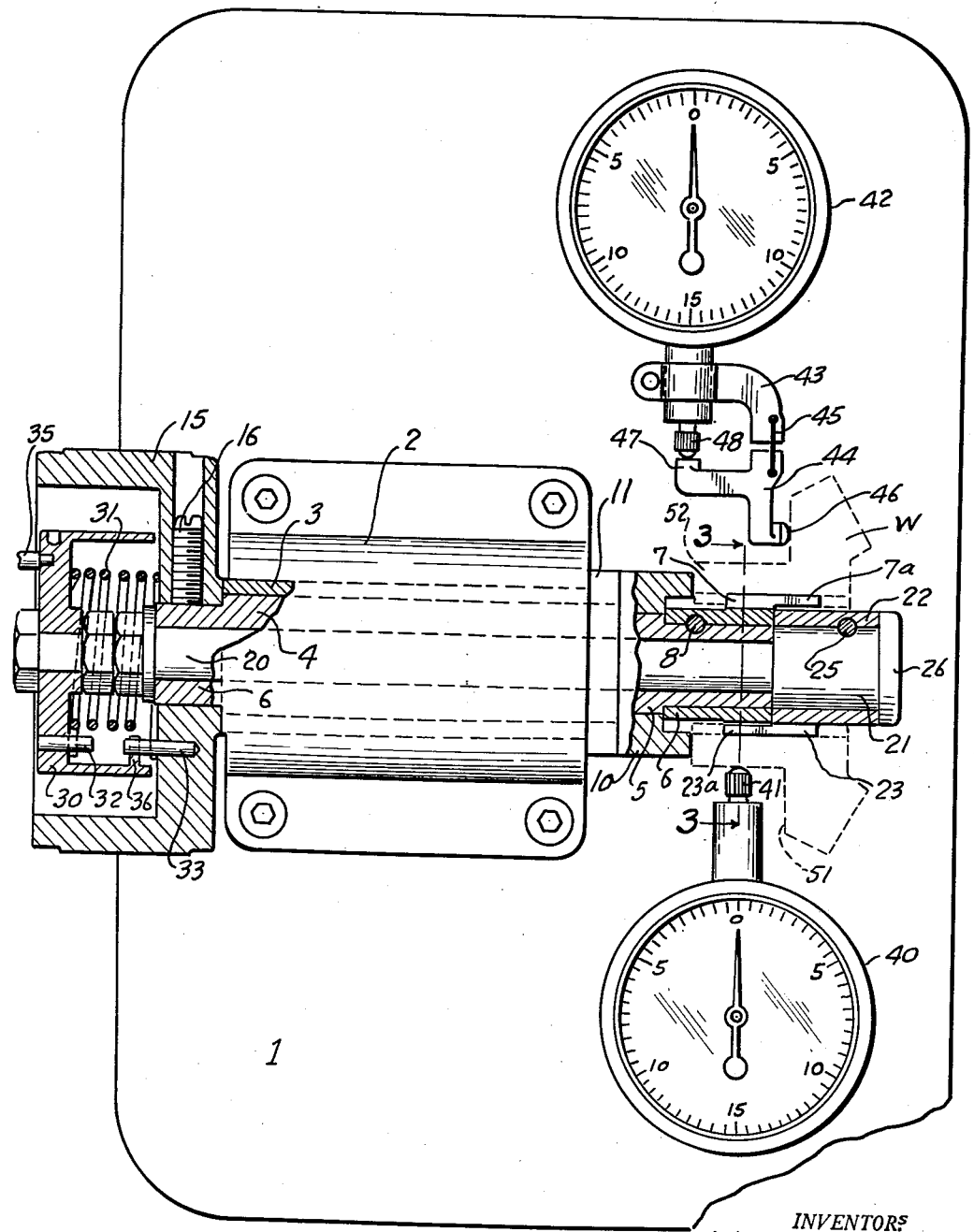
Fig. 2 is an enlarged view partly in plan and partly in section showing the work piece in dotted lines as applied to the gauging instrument.

Mounted on the base 1 is an indicating gauge 40 having a contact actuator 41. Also mounted on the base is an indicating gauge 42. As shown in Fig. 2, the gauge 42 is provided with a fixed bracket 43 on which a lever arm 44 is mounted. This mounting is in the nature of a fulcrum afforded by a leaf spring 45 connected to the bracket 43 and the lever 44 so that the lever 44 may oscillate by flexure of the spring. The lever 44 has a contact member 46 and a contact member 47 for contacting the actuator 48 of the indicating gauge 42. The gauge 40 and the gauge 42 need no detailed description except to say that as shown, each has a dial with indicia thereon and a hand or pointer which is actuated relative to the dial as the members 41 and 48 are shifted.

The work piece selected herein to exemplify the invention is a spur gear shown in dotted lines in Fig. 2 as applied to the gauge. The gear is shown at W and has internal splines 50, a radial face 51 which is to be gauged and the circumferential face 52 of a hub formation which is to be gauged.

The holder will be seen to have a circumferential array of split teeth with each tooth constituted by a tooth portion 7 and a tooth portion 23 with their respective extensions 7a and 23a. These teeth are to be placed in the spaces between the teeth 50 of the work piece. However, as mentioned above, the torsion spring holds the portions of the split teeth relatively separated. To apply a work piece, the operator may relatively turn the sleeve 4 and the shaft 20 by engaging the hand wheel 15 and the handle or finger piece 35 to relatively rock the two against the action of the spring to bring the tooth portions together. The work piece may now be applied as shown in Fig. 2 by slipping the same over the holder. The work piece is to be abutted against the locating sleeve or element 10 as shown. When the operator releases the element 15 and the finger piece 35 the spring rocks the sleeve 4 and the shaft 20 so that the tooth portions 7 and 23 spread apart by the yielding action of the spring and snugly engage in the spaces or grooves between the teeth 50 of the work piece. Thus, the work piece is held by its internal spline or tooth formation.

When the work piece is in the position, as shown in Fig. 2, the contact element 46 engages the surface 51 and the contact piece 41 engages the peripheral surface 52 of the hub of the work piece. These two surfaces are now to be gauged as to squareness and as to concentricity relative to the internal teeth or splines of the work piece. In other words, the work piece is held by its internal splined construction; the radial face 51 is gauged as to squareness relative to the internal spline formation and the exterior surface 52 of the hub is gauged as to concentricity relative to the internal spline formation. The actual gauging is accomplished by rotating the hand wheel 15 which rotates the sleeve and the work piece and in its rotation the indicating gauges are observed. Preferably, the indicating gauges are so calibrated and set up so that if the work piece surfaces are perfect the indicating gauges read zero. The gauges accordingly will indicate a plus or minus condition of the surfaces. In other words, if the surface 51 is to the left or to the right of a perfect location, as Fig. 2 is viewed, the indicating gauge 42 will show this condition and will indicate how much the inaccuracy. The gauge 40 will likewise indicate an oversize or undersize condition of the hub and the extent of the inaccuracy. Local variations in the surface 51 and variations of the surface 52 relative to a true circle is indicated by movement of the hands of the indicator gauges as the work piece is rotated.

The surfaces 51 and 52 are thereby gauged relative to the internal spline formation regardless of whether the spline formation itself is oversize or undersize. It is within the choice of the manufacturer to reject work pieces which are not within the tolerances or standards set or to mark the work pieces with an indication of their condition so that they can be used in cooperation with other work pieces where the inaccuracies ascertained is of no consequence.

We claim:
1. A device for holding a work piece which has a spline or tooth formation and surfaces to be gauged as to their position relative to the spline or tooth formation comprising, a support, a first member journalled in the support, a second member co-axially journalled in the first member, means on one member for rotating the same, handle means on the other member, spring means interacting between the two members, stop means interassociating the two members, said spring means being normally flexed and the stop means being effective to limit the action of the spring means and hold the members positioned relative to each other, the members being rockable relative to each other against the action of the spring members by relative manipulation of the said rotating means and said handle means, tooth portions on the first member, tooth portions on the second member, said tooth portions overlapping each other axially and cooperating in pairs to form split teeth adapted to receive the spline or tooth formation of the work piece, the work piece being applicable thereto when the two members are relatively rocked against the action of the spring to bring the cooperating pairs of tooth portions together, and the work piece being held by the tooth portions as they are separated by the spring, and a stop for locating the work piece axially, whereby upon rotation of the members in unison the work piece is rotated and the said surfaces on the work piece may be gauged relative to the spline or tooth formation on the work piece.

2. A device for holding a work piece which has a hub with a spline or tooth formation and radial and substantially circumferential surfaces so that the said surfaces may be gauged comprising, a rotatably mounted first member, a rotatably mounted second member, said members being rockable relative to each other and rotatable in unison, tooth portions on the first member, tooth portions on the second member, said tooth portions overlapping each other and cooperating in pairs to form split teeth adapted to receive the spline or tooth formation of the work piece, the work piece being applicable when the two members are rocked relative to each other to bring the cooperating pairs of tooth portions together, spring means normally holding the cooperating pairs of tooth portions separated whereby to grip the work piece, a stop for locating the work piece axially, and means for rotating the members in unison whereby said surfaces of the work piece may be gauged to indicate the condition of said surfaces relative to the spline or tooth formation on the work piece.

JOHN J. PARKER.
LONDON T. MORAWSKI.

REFERENCES CITED

The following references are of record in the file of this patent:

UNITED STATES PATENTS

| Number | Name | Date |
| --- | --- | --- |
| 1,577,299 | Rodhe | Mar. 16, 1926 |
| 2,371,451 | Larson | Mar. 13, 1945 |
| 2,408,689 | Seme | Oct. 1, 1946 |
| 2,443,895 | Day | June 22, 1948 |
| 2,445,184 | Parker | July 13, 1948 |

FOREIGN PATENTS

| Number | Country | Date |
| --- | --- | --- |
| 464,875 | England | Apr. 27, 1937 |